(12) United States Patent
Al-Qasim et al.

(10) Patent No.: US 11,912,939 B2
(45) Date of Patent: *Feb. 27, 2024

(54) MAGNETIC COVALENT ORGANIC FRAMEWORKS AS STABILIZER AND MARKER FOR SUBSURFACE MONITORING

(71) Applicant: SAUDI ARABIAN OIL COMPANY, Dhahran (SA)

(72) Inventors: Abdulaziz S. Al-Qasim, Dammam (SA); Yuguo Wang, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 17/213,449

(22) Filed: Mar. 26, 2021

(65) Prior Publication Data
US 2022/0306932 A1   Sep. 29, 2022

(51) Int. Cl.
*E21B 43/16* (2006.01)
*C09K 8/92* (2006.01)

(52) U.S. Cl.
CPC ............. *C09K 8/92* (2013.01); *E21B 43/164* (2013.01); *C09K 2208/10* (2013.01)

(58) Field of Classification Search
CPC ............................... C09K 8/92; E21B 43/164
USPC ...................................................... 166/305.1
See application file for complete search history.

(56) References Cited

U.S. PATENT DOCUMENTS

| | | | |
|---|---|---|---|
| 7,373,977 B1 | 5/2008 | Berger et al. | |
| 9,604,194 B2 * | 3/2017 | Wang | B01J 20/28045 |
| 10,214,680 B2 | 2/2019 | Barati Ghahfarokhi | |
| 10,934,475 B2 | 3/2021 | Ren et al. | |
| 11,279,621 B1 | 3/2022 | Liu et al. | |
| 2006/0046947 A1 | 3/2006 | Chen | |
| 2009/0054272 A1 | 2/2009 | Prud'Homme et al. | |

(Continued)

FOREIGN PATENT DOCUMENTS

| | | |
|---|---|---|
| CA | 3008942 A1 | 6/2017 |
| EP | 2902361 A1 | 8/2015 |

(Continued)

OTHER PUBLICATIONS

Anderson et al.; "First-Principles Prediction of Liquid/Liquid Interfacial Tension", Journal of Chemical Theory and Computation, vol. 10, Issue 8, May 28, 2014, pp. 3401-3408 (8 pages).

(Continued)

*Primary Examiner* — Zakiya W Bates
*Assistant Examiner* — Ashish K Varma
(74) *Attorney, Agent, or Firm* — Osha Bergman Watanabe & Burton LLP

(57) ABSTRACT

A dispersion of capsules in critical or supercritical carbon dioxide is provided. The capsules include an aqueous solution encapsulated by magnetic covalent organic framework particles. Also provided is a method of making a dispersion of aqueous solution capsules. The method includes providing a medium of critical or supercritical carbon dioxide, introducing the aqueous solution into the critical or supercritical carbon dioxide medium, and introducing a magnetic covalent organic framework particle into the critical or supercritical carbon dioxide medium. Associated methods of using the disclosed dispersions in hydrocarbon-bearing formations are also provided.

18 Claims, 6 Drawing Sheets

(56) References Cited

U.S. PATENT DOCUMENTS

| | | | |
|---|---|---|---|
| 2010/0243248 A1* | 9/2010 | Golomb | E21B 41/0064 166/270 |
| 2012/0015852 A1 | 1/2012 | Quintero et al. | |
| 2012/0322694 A1 | 12/2012 | Monteiro et al. | |
| 2013/0109879 A1 | 5/2013 | Berger et al. | |
| 2013/0200299 A1 | 8/2013 | Mazyar et al. | |
| 2014/0011034 A1 | 1/2014 | Majumder et al. | |
| 2014/0077138 A1 | 3/2014 | Taha-Tijerina et al. | |
| 2014/0096964 A1 | 4/2014 | Chakraborty et al. | |
| 2014/0131046 A1* | 5/2014 | Al-Otaibi | B01J 13/20 166/305.1 |
| 2016/0024374 A1* | 1/2016 | Sadana | E21B 43/164 166/272.6 |
| 2017/0198201 A1* | 7/2017 | Chang | C09K 8/588 |
| 2017/0225146 A1 | 8/2017 | Wang et al. | |
| 2017/0225147 A1 | 8/2017 | Wang et al. | |
| 2018/0320056 A1* | 11/2018 | Mazyar | C09K 8/58 |
| 2018/0327658 A1 | 11/2018 | Al-Harbi et al. | |
| 2019/0345374 A1 | 11/2019 | Al-Otaibi et al. | |
| 2020/0290879 A1 | 9/2020 | Chang et al. | |
| 2020/0308080 A1 | 10/2020 | Gamot et al. | |

FOREIGN PATENT DOCUMENTS

| | | | |
|---|---|---|---|
| WO | 201664611 | A1 | 4/2016 |
| WO | 2016115142 | A1 | 7/2016 |
| WO | 2016205289 | A1 | 12/2016 |
| WO | 2019140340 | A1 | 7/2019 |

OTHER PUBLICATIONS

Voronina et al., "Physical foaming of fluorinated ethylene-propylene (FEP) copolymers in supercritical carbon dioxide: single-film fluropolymer piezoelectrets", Applied Physics A—Materials Science & Processing, vol. 90, Issue 4, Mar. 2008, pp. 615-618 (4 pages).

Zhang, Y et al., "Dissolution of surfactants in supercritical CO2 with co-solvents", Chemical Engineering Research and Design, vol. 94, Feb. 2015, pp. 624-631 (8 pages).

Rudyk et al., "Supercritical carbon dioxide extraction of oil sand enhanced by water and alcohols as Co-solvents", Journal of CO2 Utilization, vol. 17, Jan. 2017, pp. 90-98 (9 pages).

Jaime Wisniak and Jacob Zabicky, "The Chemistry of Jojoba Oil", Proceedings of the Sixth International Conference on Jojoba and Its Uses, 1985, pp. 311-322 (7 pages).

"Graphene properties (A Complete Reference)", Jul. 15, 2021; Retrieved from the Internet: URL: http://www.graphene-battery.net/graphene-properties.htm (2 pages).

Li et al., "Field and Temperature dependence of intrinsic diamagnetism in graphene: Theory and experiment", Physical Review B, vol. 91, Issue 9, Mar. 1, 2015 (5 pages).

Shinn et al., "Nuclear Energy Conversion with Stacks of Graphene Nanocapacitors", Complexity, vol. 18, Issue 3, Oct. 22, 2012, pp. 24-27 (4 pages).

A.K. Geim and K.S. Novoselov, "The Rise of Graphene", Nature Materials, vol. 6, Apr. 2007, pp. 1-14 (14 pages).

Kawaguchi et al., "Electronic structure and intercalation chemistry of graphite-like layered material with a composition of BC6N", Journal of Physics and Chemistry of Solids, vol. 69, Issues 5-6, May 2008, pp. 1171-1178 (8 pages).

Lee et al., "A route towards superhydrophobic graphene surfaces: surface-treated reduced graphene oxide spheres", Journals of Materials Chemistry A, vol. 1, Issue 25, 2013, pp. 7312-7315 (4 pages).

Zhang et al., "Biomimetic graphene films and their properties", Nanoscale, vol. 4, Issue 16, Jun. 6, 2012, pp. 4858-4869 (12 pages).

Wang et al., "Biomimetic Graphene Surfaces with Superhydrophobicity and Iridescence", Chemistry An Asian Journal, vol. 7, Issue 2, Feb. 6, 2012, pp. 301-304 (4 pages).

Zhang et al., "Super-hydrophobic graphene coated polyurethane (GN@PU) sponge with great oil-water separation perfomance", Applied Surface Science, vol. 422, Nov. 2017, pp. 116-124 (9 pages).

Zengguo Bai and Bin Zhang, "Fabrication of superhydrophobic reduced-graphene oxide/nickel coating with mechanical durability, self-cleaning and anticorrosion performance", Nano Materials Science, vol. 2, Issue 2, Jun. 2020, pp. 151-158 (8 pages).

Wang et al., "Recent developments in superhydrophobic graphene and graphene-related materials: from preparation to potential applications", Nanoscale, Issue 16, Mar. 12, 2015 (15 pages).

Kumari et al., "Corrosion-Resistant Hydrophobic Nanostructured Ni-Reduced Graphene Oxide Composite Coating with Improved Mechanical Properties", Journal of Materials Engineering and Performance, vol. 27, Issue 18, Oct. 23, 2018, pp. 5889-5898 (9 pages).

Zhang et al., "One-step fabrication of robust superhydrophobic and superoleophilic surfaces with self-cleaning and oil/water separation function", Scientific Reports, vol. 8, Mar. 2018, pp. 1-12 (12 pages).

Boinovich et al., "Origins of Thermodynamically Stable Superhydrophobicity of Boron Nitride Nanotubes Coatings", Langmuir, vol. 28, No. 2, Jan. 17, 2012, pp. 1206-1216 (11 pages).

Aliev et al., "Superhydrophobic Coatings Based on Boron Nitride Nanotubes: The Mechanism of Superhydrophobicity and Self-Regeneration of Highly Hydrophobic Properties", Nanotechnologies in Russia, vol. 6, Nos. 11-12, Dec. 23, 2011, pp. 723-732 (10 pages).

Lee et al., "Superhydrophobicity of Boron Nitride Nanotubes Grown on Silicon Substrates", Langmuir, vol. 25, No. 9, Apr. 8, 2009, pp. 4853-4860 (8 pages).

Zhou et al., "Superhydrophobic hBN-Regulated Sponges with Excellent Absorbency Fabricated Using a Green and Facile Method", Scientific Reports, vol. 7, Mar. 23, 2017, pp. 1-10 (10 pages).

Diao et al., "Oil adsorption performance of graphene aerogels", Journal of Materials Science, vol. 55, Dec. 16, 2019, pp. 4578-4591 (14 pages).

Petridis et al., "Advanced Low-Cost Separation Techniques in Interface Science", Elsevier, Ch. 8, vol. 30, 2019, pp. 173-197 (25 pages).

Ning et al.; "High capacity oil adsorption by graphene capsules"; Nanoscale; Issue 34; Jul. 27, 2017 (5 pages).

Chen et al.; "Graphene Sponge as an Efficient and Recyclable Oil Sorbent"; AIP Conference Proceedings; vol. 1877; Issue 1; Sep. 11, 2017; pp. 030005-1-030005-10 (10 pages).

Marchesini et al.; "Porous Boron Nitride Materials: Influence of Structure, Chemistry and Stability on the Adsorption of Organics", Frontiers in Chemistry; vol. 7; Mar. 2019; pp. 1-9 (9 pages).

Li et al.; "Tuning the Chemical Hardness of Boron Nitride Nanosheets by Doping Carbon for Enhanced Adsorption Capacity", ACS Omega; vol. 2; Issue 9; Sep. 1, 2017; pp. 5385-5394 (10 pages).

J. Luo et al.; "Activated boron nitride ultrathin nanosheets for enhanced adsorption desulfurization performance"; Journal of the Taiwan Institute of Chemical Engineers; vol. 93; Dec. 2018; pp. 245-252 (8 pages).

A. K. Mishra and S. Ramaprabhu; "Carbon dioxide adsorption in graphene sheets"; AIP Advances; vol. 1; Issue 3; Sep. 1, 2011; pp. 032152-1-032152-6 (6 pages).

D. Iruretagoyena et al.; "Adsorption of carbon dioxide on graphene oxide supported layered double oxides", Adsorption; vol. 20; Dec. 5, 2013; pp. 321-330 (10 pages).

W Othman et al.; "Adsorption of CO2 on Fe-doped graphene nano-ribbons: Investigation of transport properties"; Journal of Physics: Conference Series; vol. 869; Jul. 2017 (4 pages).

Xu et al.; "The CO2 Storage Capacity of the Intercalated Diaminoalkane Graphene Oxides: A Combination of Experimental and Simulation Studies"; Nanoscale Research Letters; vol. 10; Aug. 8, 2015; pp. 1-10 (10 pages).

Sun et al.; "Charge-Controlled Switchable CO2 Capture on Boron Nitride Nanomaterials", Journal of the American Chemical Society; vol. 135; Issue 22; May 2013 (9 pages).

Li, J et al.; "Activated boron nitride as an effective adsorbent for metal ions and organic pollutants"; Scientific Reports; vol. 3; Nov. 13, 2013; pp. 1-7 (7 pages).

Mao, X et al.; "Metal-free graphene/boron nitride heterointerface for CO2 reduction: Surface curvature controls catalytic activity and selectivity"; vol. 2; Issue 1; Jan. 19, 2020; pp. 1-8 (8 pages).

(56) References Cited

OTHER PUBLICATIONS

Chen, S et al.; "Carbon Doping of Hexagonal Boron Nitride Porous Materials toward CO2 Capture"; Journal of Materials Chemistry A; Issue 4; 2018; pp. 1-9 (9 pages).
Coleman, J. N. et al.; "Two-Dimensional Nanosheets Produced by Liquid Exfoliation of Layered Materials"; Science; vol. 331; Issue 6017; Feb. 4, 2011; pp. 568-571 (4 pages).
A. Ambrosi and M. Pumera, "Electrochemically Exfoliated Graphene and Graphene Oxide for Energy Storage and Electrochemistry Applications"; Chemistry A European Journal; vol. 22; Issue 1; Jan. 4, 2016; pp. 153-159 (7 pages).
Chen, Z. et al.; "Activated carbons and amine-modified materials for carbon dioxide capture—a review"; Frontiers of Enviromental Science & Engineering; vol. 7; Jun. 2013; pp. 326-340 (15 pages).
Chen, B et al.; "Atomically homogeneous dispersed ZnO/N-doped nanoporous carbon composites with enhanced CO2 uptake capacities and high efficient organic pollutants removal from water"; Carbon; vol. 95; Aug. 8, 2015; bages 113-124 (12 pages).
Al Otaibi, M. S.; "Post-Synthesis Functionalization of Porous Organic Polymers for CO2 Capture"; KAUST Research epository; Jul. 2014; pp. 1-70 (70 pages).
Dawson, R. et al.; "Nanoporous organic polymer networks"; Progress in Polymer Science; vol. 37; Issue 4; Apr. 2012; pp. 530-563 (34 pages).
Maly, K. E.; "Assembly of nanoporous organic materials from molecular building blocks"; Journal of Materials Chemistry; vol. 19; Issue 13; Jan. 14, 2009; pp. 1781-1787 (7 pages).
Jiang, J. and Cooper, A. I.; "Microporous Organic Polymers: Design, Synthesis, and Function"; Topics in Current Chemistry; vol. 293; Sep. 1, 2009; pp. 1-33 (33 pages).
Côté, A. P et al.; "Porous, Crystalline, Covalent Organic Frameworks"; Science; vol. 310; Nov. 18, 2005; pp. 1166-1170 (5 pages).
El-Kaderi, H. M. et al.; "Designed Synthesis of 3D Covalent Organic Frameworks"; Science; vol. 316; Apr. 13, 2007; pp. 268-272 (5 pages).
Uribe-Romo, F. J. et al.; "A Crystalline Imine-Linked 3-D Porous Covalent Organic Framework"; Journal of the American Chemical Society; vol. 131; pp. 4570-4571 (2 pages).
Duncan J. Shaw; "Introduction to Colloid and Surface Chemistry"; Butterworth-Heinemann; Ch. 10; Feb. 24, 1992; pp. 262-276 (15 pages).
Sun et al.; "Integrating Superwettability within Covalent Organic Frameworks for Functional Coating"; Chem; vol. 4; Jul. 12, 2018; pp. 1-14 (14 pages).
Liu et al.; "A hydrophilic covalent organic framework for photocatalytic oxidation of benzylamine in water"; Chemical Communications; Issue 5; Dec. 10, 2019 (5 pages).
Hou et al.; "Covalent Organic Framework-Functionalized Magnetic CuFe2O4/Ag Nanoparticles for the Reduction of 4-Nitrophenol"; Nanomaterials; vol. 10; Issue 3; Mar. 2020; pp. 1-13 (13 pages).
Li et al.; "Core-Shell Structured Magnetic Covalent Organic Framework Nanocomposites for Triclosan and Triclosan Adsorption"; ACS Applied Materials & Interfaces; vol. 11; Jun. 10, 2019; pp. 22492-22500 (9 pages).
Cai et al.; "Magnetic solid phase extraction and gas chromatography-mass spectrometrical analysis of sixteen polycyclic aromatic hydrocarbons"; Journal of Chromatography A; vol. 1406; Jun. 20, 2015; pp. 40-47 (8 pages).
Kyakuno et al.; "Amorphous water in three-dimensional confinement of zeolite-templated carbon"; Chemical Physics Letters; vol. 571; Apr. 17, 2013; pp. 54-60 (7 pages).
Jiao et al.; "Water under the Cover: Structures and Thermodynamics of Water Encapsulated by Graphene"; Scientific Reports; vol. 7; Sep. 2015; pp. 1-19 (19 pages).
Samara et al.; "Unconventional oil recovery from AI Sultani tight rock formations using supercritical CO2"; The Journal of Supercritical Fluids; vol. 152; Oct. 2019; pp. 1-9 (9 pages).
Han et al.; "Superhydrophobic Covalent Organic Frameworks Prepared via Pore-Surface Modifications for Functional Coatings under Harsh Conditions"; ACS Applied Materials & Interfaces; vol. 12; Nov. 21, 2019; pp. 2926-2934 (40 pages).
Xu et al.; "Organic-Inorganic Composite Nanocoatings with Superhydrophobicity, Good Transparency, and Thermal Stability"; vol. 4; No. 4; Mar. 19, 2010; pp. 2201-2209 (9 pages).
Furukawa, H. and Yaghi, O. M.; "Storage of Hydrogen, Methane, and Carbon Dioxide in Highly Porous Covalent Organic Frameworks for Clean Energy Applications"; Journal of the American Chemical Society; vol. 131; Jun. 4, 2009; pp. 8875-8883 (9 pages).
Geng et al.; "Covalent Organic Frameworks: Design, Synthesis, and Functions"; Chemical Reviews; vol. 120; Issue 16; Jan. 22, 2020; pp. CW-DP (20 pages).
Prakesh et al.; "Spontaneous recovery of superhydrophobicity on nanotextured surfaces"; Proceedings of the National Academy of Sciences; vol. 113; No. 20; May 2, 2016; pp. 1-6 (6 pages).
Tie et al.; "Organic Media Superwettability: On-Demand Liquid Separation by Controlling Surface Chemistry"; ASC Applied Materials & Interfaces; vol. 10; No. 43; Oct. 8, 2018 (27 pages).
Liu et al.; "Developments of 'Liquid-like' Copolymer Nanocoatings for Reactive Oil-Repellent Surface"; ACS Nano; vol. 11; No. 2; Feb. 23, 2017; pp. 2248-2256 (9 pages).
Office Action issued in corresponding U.S. Appl. No. 17/213,440 dated Mar. 18, 2022 (27 pages).
Office Action issued in related U.S. Appl. No. 17/213,411, dated Apr. 22, 2022 (29 pages).
Final Office Action Issued in Corresponding U.S. Appl. No. 17/213,411, dated Aug. 1, 2022, 22 pages.
Final Office Action Issued in Corresponding U.S. Appl. No. 17/213,440, dated Jun. 21, 2022, 14 pages.
Non-Final Office Action Issued in Corresponding U.S. Appl. No. 17/213,440, dated Sep. 30, 2022, 22 pages.
Office Action issued in the corresponding U.S. Appl. No. 17/213,411, dated Jun. 15, 2023 (12 pages).
Office Action dated Mar. 2, 2023 in corresponding U.S. Appl. No. 17/213,411, 15 pages.

\* cited by examiner

MAGNETIC COVALENT ORGANIC FRAMEWORKS AS STABILIZER AND MARKER FOR SUBSURFACE MONITORING

BACKGROUND

During primary oil recovery, oil inside an underground hydrocarbon reservoir is driven to the surface by a pressure difference between the reservoir and the surface. However, only a fraction of the oil in an underground hydrocarbon reservoir can be extracted using primary oil recovery. Thus, a variety of techniques for enhanced oil recovery are utilized after primary oil recovery to increase the overall production of hydrocarbons from hydrocarbon-bearing formations. Some examples of these techniques include water flooding, chemical flooding, and supercritical $CO_2$ injections.

Supercritical $CO_2$ is an useful fluid for enhanced oil recovery applications due to its chemical and physical properties. Supercritical $CO_2$ is miscible with hydrocarbons. Thus, when it contacts hydrocarbon fluid in a reservoir, the fluid is displaced from the rock surfaces and pushed toward the production well. Additionally, $CO_2$ may dissolve in the hydrocarbon fluid, reducing its viscosity and causing it to swell. This further enhances the ability to recover hydrocarbons and increase production. As well, injecting $CO_2$ into a subterranean area is a means of sequestering a greenhouse gas.

SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

In one aspect, embodiments disclosed relate to an aqueous solution encapsulated by magnetic covalent organic framework particles.

In another aspect, embodiments disclosed relate to a dispersion of capsules in critical or supercritical carbon dioxide, the capsules comprising an aqueous solution encapsulated by magnetic covalent organic framework particles.

In yet another aspect, embodiments disclosed relate to a method of making a dispersion of aqueous solution capsules. The method includes providing a medium of critical or supercritical carbon dioxide, introducing the aqueous solution into the critical or supercritical carbon dioxide medium, and introducing a magnetic covalent organic framework particle into the critical or supercritical carbon dioxide medium.

In another aspect, embodiments disclosed relate to a method of treating a hydrocarbon-bearing formation. The method includes introducing into a hydrocarbon-bearing formation a dispersion of aqueous solution capsules in a medium of critical or supercritical carbon dioxide. The aqueous solution capsules include an aqueous solution encapsulated by magnetic covalent organic framework particles.

Other aspects and advantages of the claimed subject matter will be apparent from the following description and the appended claims.

DETAILED DESCRIPTION

Carbon dioxide ($CO_2$) is widely used in flooding processes for enhanced oil recovery. While it can be effective for oil recovery due to its affinity for hydrocarbons and its ability to be used in its supercritical state in hydrocarbon-bearing formations, it suffers from a number of challenges in its use. The density of $CO_2$ is less than many of the fluids present in subterranean formations, including water and the liquid and semi-solid hydrocarbons. Due to this reduced density, $CO_2$ has a tendency to seek upward-directed flow paths in the reservoir as it progresses away from the injection point and through the reservoir. This may lead to the introduced $CO_2$ preferentially bypassing portions of the reservoir, leaving sections untreated. This phenomenon is called "gravity override."

The present disclosure relates to compositions and methods for increasing the density of carbon dioxide ($CO_2$) in the critical or supercritical state (in total "SCCO2") by adding an aqueous solution encapsulated by magnetic covalent organic framework (MCOF) particles to the SCCO2 medium. The SCCO2-based dispersions described here provide a $CO_2$ composition in the critical or supercritical state with a greater density than critical or supercritical $CO_2$ without the dispersants that does not suffer from the gravity override effect. Such compositions lead to improved sweep efficiency and enhanced oil recovery of the hydrocarbon-bearing formation. Such compositions may also be traced in the formation due to the presence of magnetic particles that may be detected by a variety of measurement techniques.

Capsules of Aqueous Solution

Figure 1:
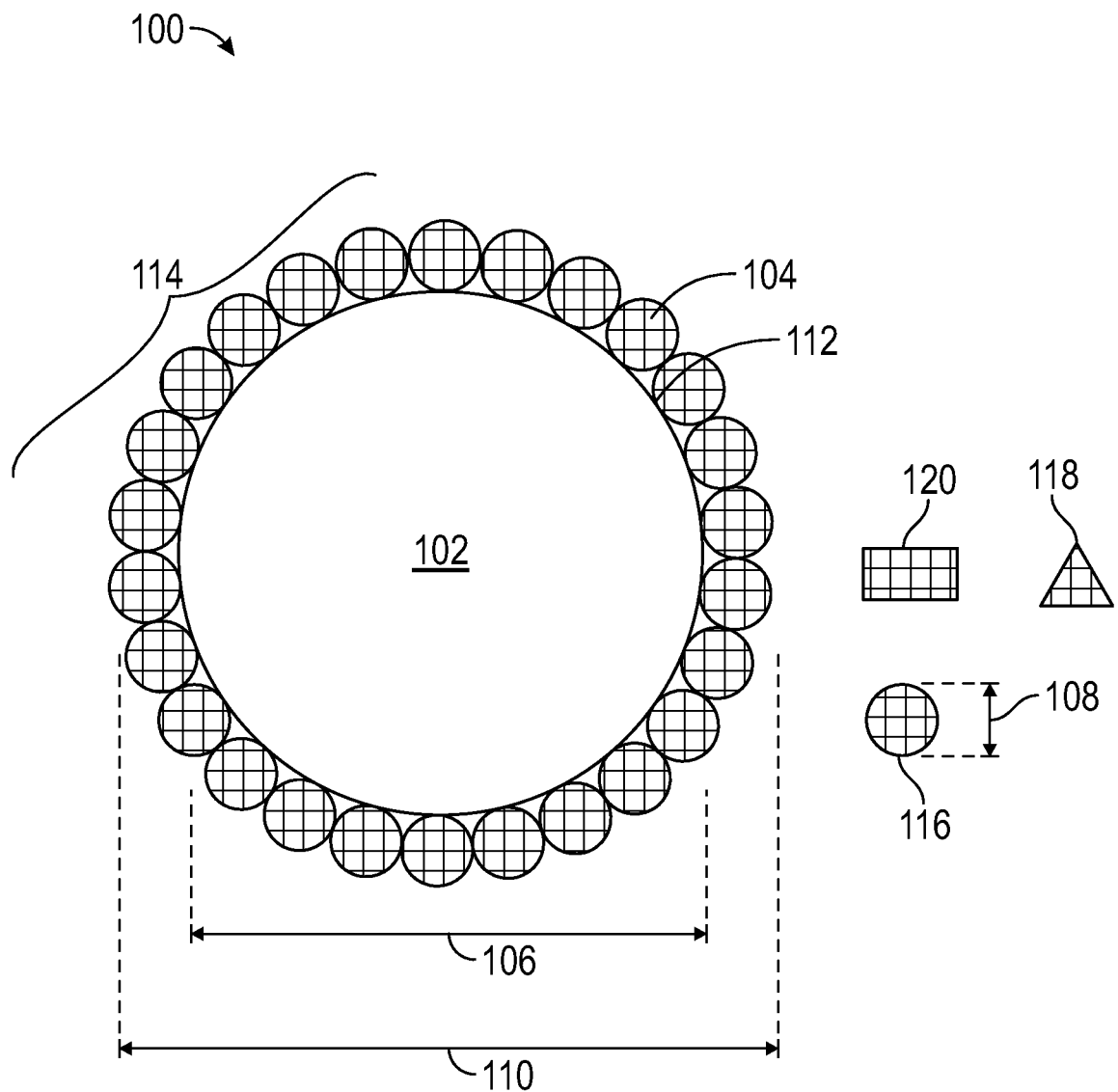
FIG. 1 is a simplified schematic of an embodiment capsule useful for treating hydrocarbon-bearing formations.

In one aspect, embodiment capsules disclosed relate to an aqueous solution encapsulated by MCOF (magnetic covalent organic framework) particles. FIG. 1 shows a simplified schematic of an embodiment capsule useful for treating subterranean formations. FIG. 1 shows a capsule 100 having an aqueous solution 102 that is encapsulated by MCOF particles 104. The aqueous solution 102 as given in capsule 100 has a solution diameter 106. The MCOF particles 104 have a MCOF particle diameter 108. The capsule 100 has a capsule diameter 110. In the embodiment shown in FIG. 1, the surface 112 of the aqueous solution 102 is surrounded by a layer of MCOF particles 104 which form an encapsulating shell 114 around the aqueous solution 102 such that it is encapsulated. Several potential 3-dimensional (3D) shapes of the MCOF particles 104 are represented, such as spherical 116, pyramidal 118, and cubic 120.

Embodiment capsules include an aqueous solution. For embodiment capsules, the aqueous solution includes water. The water may comprise one or more known compositions of water, including distilled; condensed; filtered or unfiltered fresh surface or subterranean waters, such as water sourced from lakes, rivers or aquifers; mineral waters; gray water; run-off, storm or waste water; potable or non-potable waters;

brackish waters; synthetic or natural sea waters; synthetic or natural brines; formation waters; production water; and combinations thereof.

In some embodiments, within the embodiment capsule the aqueous solution is in the form of a liquid, for example, a droplet or sphere. In such embodiments, the solution diameter may have a range of from about 10 nm (nanometers) to about 100 μm (micrometers), meaning the capsules have a $D_1$ of about 10 nm and a $D_{99}$ of about 100 μm. In some embodiments, the solution diameter may have a range of from about 10 nm to 200 nm. In other embodiments, the solution diameter may have a range of from about 10 μm to 100 μm. A $D_1$ value means that 1% of the diameters have a diameter of less than the $D_1$ value. A $D_{99}$ value means that 99% of the solution diameters have a diameter of less than the $D_{99}$ value.

Embodiment capsules also include a magnetic covalent organic framework (MCOF) particle. In some such embodiments, the magnetic covalent organic framework particle comprises a covalent organic framework (COF) and a magnetic particle.

Embodiment covalent organic frameworks are crystalline porous polymers. The polymer backbone of embodiment COFs is not particularly limited and may composed of light elements, such as boron, carbon, nitrogen, oxygen, and silicon, and combinations thereof. In some embodiments, the COF backbone may include at least one hydrophobic aromatic structure, such as a benzene ring.

Figure 2:
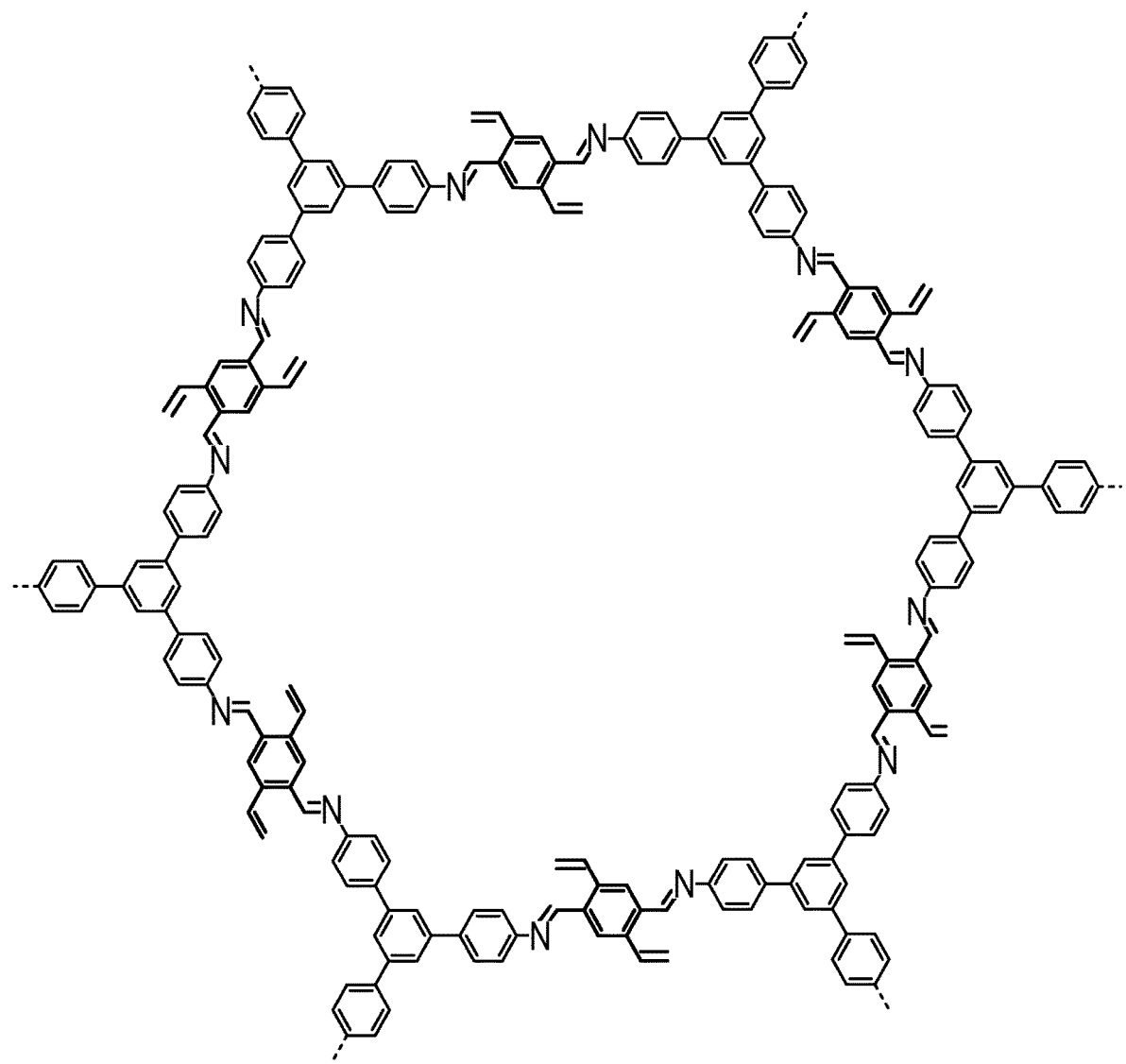
FIG. 2 is a covalent organic framework backbone structure in accordance with one or more embodiments of the present disclosure.
Figure 3:
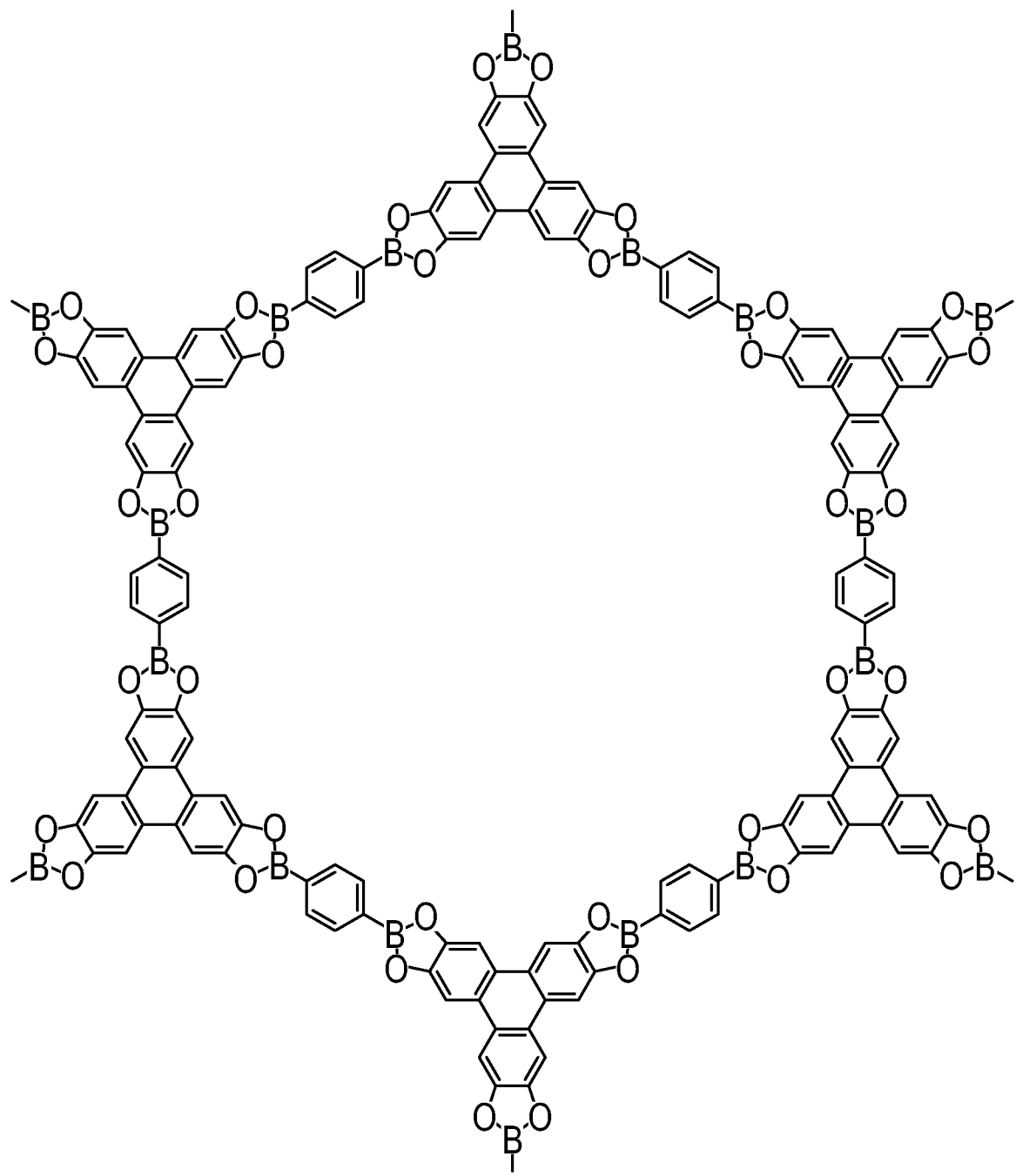
FIG. 3 is a covalent organic framework backbone structure in accordance with one or more embodiments of the present disclosure.

In certain embodiments, the disclosed COFs may have a backbone structure as shown in FIG. 1 or FIG. 2.

Embodiment COFs may be composed of monomers that have been polymerized to form repeating units to make up the covalent organic framework. As such, the structure of embodiment COFs may be determined by the structure of embodiment monomers. Exemplary monomers include, but are not limited to, 1,3,5-tris(4-aminophenyl)-benzene (Formula 3); 2,5-divylterephthaladehyde (Formula 4); phenyl diboronic acid (Formula 5); and hexahydroxytriphenylene (Formula 6):

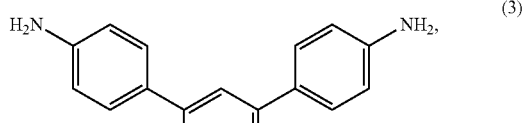

(3)

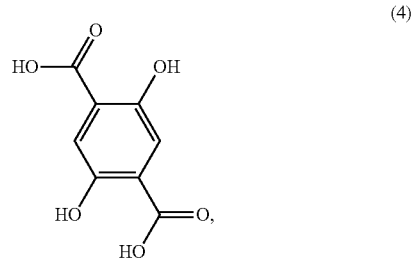

(4)

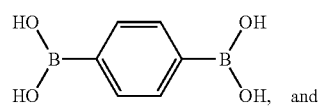

(5)

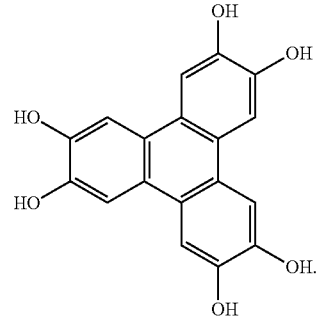

(6)

Useful monomers may include two, three, or four linking groups that participate in polymerization reactions to form embodiment COFs. Such linking groups may include amines, hydroxyl groups, aldehydes, alkenes and alkynes. Polymerization reactions to form the COF structures may include, for example, condensation reactions of the previously described monomers.

Embodiment COFs may be hydrophobic. In such embodiments, the water contact angle of embodiment COFs is in a range of from about 90° to about 180°. In some embodiments, the water contact angle of embodiment COFs is at least 120°, such as at least 150°.

In some embodiments, MCOFs comprise COFs that are functionalized. In some embodiments, the COFs are fluorinated, brominated or chlorinated. Imparting such chemical functionality may increase the hydrophobicity of the MCOFs.

Embodiment MCOFs may include COFs that have an appropriate BET surface area for use in supercritical $CO_2$ environments. As used here, "BET surface area" refers to the average surface area of the COFs as measured by the BET (Brunauer Emmet Teller) nitrogen absorption method according to ASTM D-6556. BET surface area is reported in meters squared per gram ($m^2/g$) of material. As will be explained in greater detail, in embodiment dispersions, supercritical $CO_2$ adsorbs on the surface of hydrophobic COFs. Without wishing to be bound by any particular mechanism or theory, it is believed that by modifying the surface area of embodiment COFs, the amount of $CO_2$ adsorption to the surface of the COFs may be increased or decreased. That is, it is believed that increasing particle surface area will result in greater amounts of $CO_2$ being absorbed by the MCOF particle. In turn, greater amount of $CO_2$ concentrated in a smaller volume of material results in a further densification of the bulk SCCO2 medium.

In some embodiments, the BET surface area of embodiment COFs may be in a range of from about 700 to about 3700 $m^2/g$. In some embodiments, the BET surface area of embodiment COFs may have a lower limit of one of 700, 725, 750, 800, 900, 1000, 1200, 1400, 1700, 1750, 1775, and 1800 $m^2/g$, and an upper limit of one of 2000, 2250, 2500, 2750, 3000, 3250, 3500, and 3700 $m^2/g$, where any lower limit may be paired with any mathematically compatible upper limit.

Embodiment MCOFs may include a magnetic particle. The magnetic particles may be metal oxides, such as $\alpha Fe_2O_3$, NiO, $Y_3Fe_5O_{12}$, $SrFe_{12}O_{19}$, (La, Sr)$MnO_3$, $CrO_2$, $Tl_2Mn_2O_7$, $CuFe_2O_4$, and $Fe_3O_4$.

Magnetic particles may be functionalized with linking groups. The linking groups are functional groups that may either be a nucleophile or an electrophile. These linking groups may react with functionality on the COF structure in order to form a COF shell around the magnetic particles. Examples of linking groups include, but are not limited to, amines, hydroxyl groups, and aldehydes.

In some embodiments, the MCOF may have a core/shell structure, meaning the magnetic particle is the core and the COF is the shell. As such the COF surrounds the magnetic particle, creating a shell. In some embodiments, the core may be an iron-based oxide such as $Fe_3O_4$ or $CuFe_2O_4$ and the shell may be the previously described COF particles. Core/shell MCOF structures may be made by dispersing the magnetic core particles in a solution of monomers for forming a COF structure. As the COF structure is formed by reacting monomers, the COF forms as a shell around the magnetic particles that form the core.

In core/shell structured MCOFs, the COF shell may be any suitable thickness. In one or more embodiments, the shell thickness may have a lower limit of one of 80, 85, 90, 95 and 100 nm, and an upper limit of one of 105, 110, 115, and 120 nm, where any lower limit may be paired with any mathematically compatible upper limit.

In core/shell structured MCOFs, the core magnetic particles may have a suitable average particle size. In one or more embodiments, the average particle size of the core particles may have a lower limit of one of 6.5, 6.7, 6.9, 7.5, 8.0, 8.5, 9.0, 10.0 and 11.0 nm, and an upper limit of one of 12.0, 12.5, 13.0, 14.0, and 14.2 nm, where any lower limit may be paired with any mathematically compatible upper limit.

In some embodiments, the magnetic particle is incorporated into the structure of the COF. In such embodiments, the magnetic particle may be functionalized with a linking group, as previously described. The functionalized magnetic particle may then be reacted with appropriate monomers to form a COF that includes the magnetic particle in its structure. For example, a magnetic particle may be functionalized with amine groups. The functionalized magnetic particle may then be reacted with p-phenylenediamine and 1,3,5-triformylphloroglucinol to form an MCOF used in embodiment dispersions. Any suitable magnetic particle, such as those previously described, may be incorporated into the structure of the COF. Average particle sizes of magnetic particles are as previously described in relation to core/shell structures.

In an embodiment of a structure in which a magnetic particle is incorporated into a COF structure, $Fe_3O_4$ may be modified with amino groups through a sol-gel process by the hydrolysis and condensation of tetraothorsilicate (TEOS). This process forms a thick $SiO_2$ shell on the $Fe_3O_4$. The $Fe_3O_4$ is then grafted with 3-aminopropyltriethoxysilane (APTES), resulting in amino-group functionalized $Fe_3O_4$ particles. When $Fe_3O_4$ is functionalized with the amino group (—$NH_2$), the amino group reaction with monomers through condensation may incorporate $Fe_3O_4$ nanoparticles into the COF structure.

On the macro-scale, embodiment MCOF particles may be any appropriate shape useful for encapsulating aqueous solutions. For example, as shown in FIG. 1, COF particles are shown as spherical 116, cubic 120, and pyramidal 118; however, geometric and non-geometric configurations are not limited except as to provide for an encapsulating surface for the aqueous solution.

Embodiment MCOF particles may be any appropriate size for encapsulating aqueous solutions. Based upon the configuration or geometry of the form of the MCOF particle, the particle size may be determined by a center-traversing axis parallel with its longest length. So, for example, a sphere may be measured by its diameter; a cube by its diagonal. In some embodiments, the MCOF particles have a particle size in a range of from about 50 to about 250 nm (nanometers), meaning the MCOFs have a $D_1$ of about 50 nm and a $D_{99}$ of about 250 nm.

As described, embodiment capsules include an aqueous solution that is encapsulated by MCOF particles. The aqueous solution is surrounded by the MCOF particles and does not disperse into the medium hosting the capsules. In embodiment capsules, the aqueous solution and the MCOF particles are as previously described.

In some embodiments, capsules have a capsule size range that is effectively the diameter of the capsule, such as from about a few nanometers to a few millimeters. The capsule size range for a given embodiment capsule should be approximately the same in all directions of the roughly spherical shape; however, variations in configuration between a given MCOF particle and another may provide some statistically insignificant differences in determined capsule size range based on one diameter versus another. In such embodiments, the solution diameter may have a range of from about 10 nm (nanometers) to about 100 μm (micrometers), meaning the capsules have a $D_1$ of about 10 nm and a $D_{99}$ of about 100 μm. In some embodiments, the solution diameter may have a range of from about 10 nm to 200 nm. In other embodiments, the solution diameter may have a range of from about 10 μm to 100 μm.

Embodiment capsules may have a density in a range of from about 0.9 to about 1.2 g/mL (grams per milliliter).

Dispersion of Capsules in Super/Critical $CO_2$

Embodiments may provide at least one of the following advantages. Dispersions may have greater density than bulk SCCO2. As such, the dispersions may not have the gravity override challenges associated generally with SCCO2 in enhanced oil recovery applications. The SCCO2 dispersion may traverse deeper into target formations and treat portions of the formation that have not been treated or that have been bypassed. The compositions and methods disclosed here may result in a greater amount of oil recovery and increased oil production as compared to methods without the dispersions. The dispersions may also provide the advantage of being able to trace the dispersion during use due to the presence of magnetic particles in the dispersion.

Figure 4:
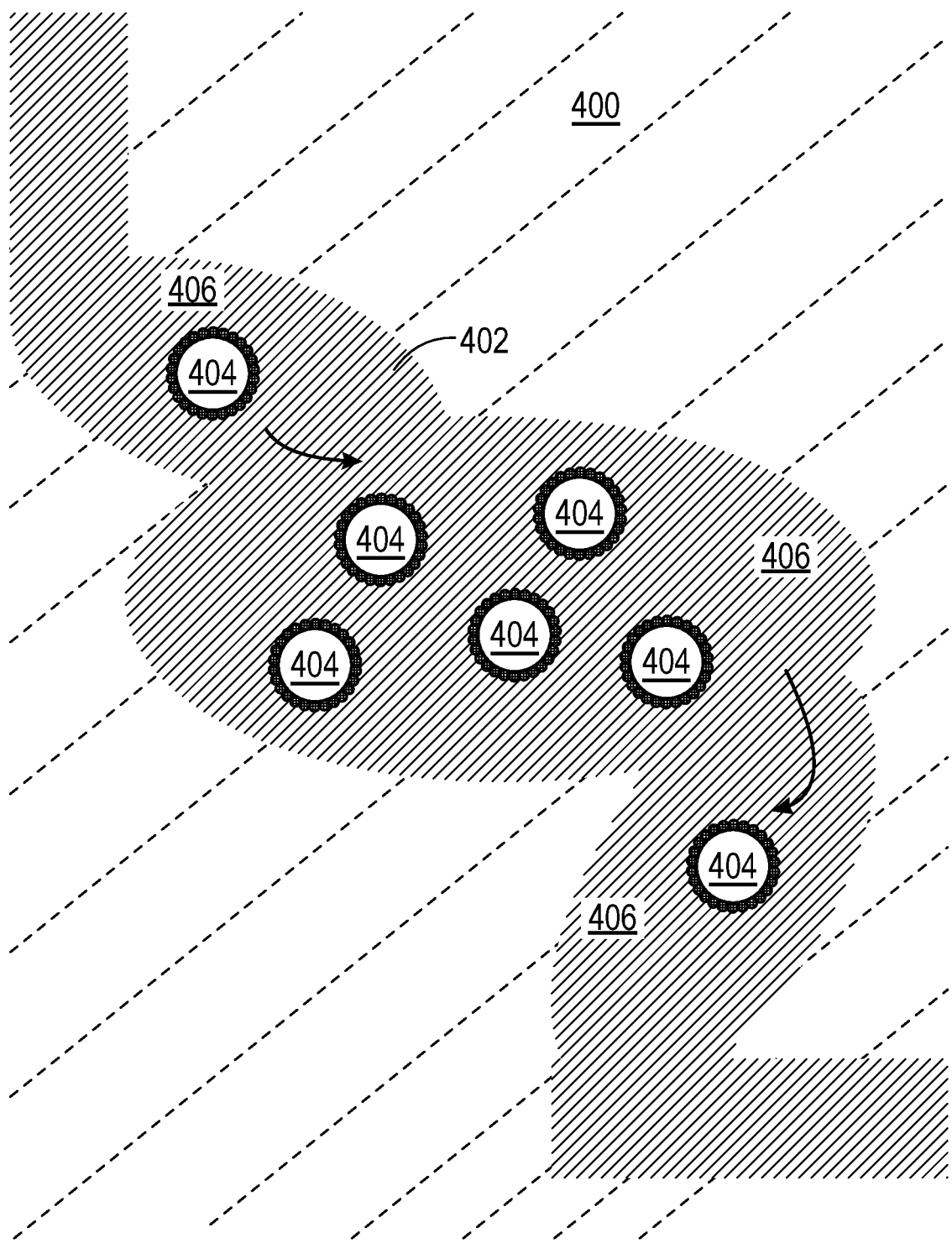
FIG. 4 is a simplified schematic of an embodiment dispersion in use in a hydrocarbon-bearing formation.

In another aspect, embodiments disclosed relate to a dispersion of the capsules previously described. FIG. 4 shows a simplified schematic of an embodiment dispersion in use in a hydrocarbon-bearing formation. A hydrocarbon-bearing formation 400 has pores 406 throughout. An embodiment dispersion within pores 406 may include SCCO2 402 and capsules 404. Arrows (not labeled) show the direction of flow of the embodiment dispersion through the hydrocarbon-bearing formation.

In embodiment dispersions, a medium of carbon dioxide that is at the critical state or in a supercritical state suspends the prior-described capsules. The critical temperature for carbon dioxide is approximately 31.1° C.; the critical pressure is approximately 8.38 MPa (megapascals). In some embodiment dispersions, the carbon dioxide is in a critical state. In some other embodiment dispersions, the carbon dioxide is in a supercritical state. Embodiment dispersions may include $CO_2$ in a temperature range of from about 50 to 100° C. Embodiment dispersions may include $CO_2$ in a pressure range of from about 1500 to 5000 psi (pounds per square inch).

In some embodiment dispersions, the carbon dioxide medium may have a purity of at least 90%. The purity of the carbon dioxide is determined before introduction of the capsules into the embodiment dispersion, the introduction of water into the carbon dioxide, or the introduction of the carbon dioxide into a subterranean formation, as any contact may introduce external impurities into SCCO2 medium.

In some embodiment dispersions, the SCCO2 medium may have a density in a range of from about 0.8 to 0.9 g/mL.

Embodiment dispersions also include the capsules as previously described. The capsules are stable in the formation environment, meaning that the MCOF particle and aqueous solution do not physically or chemically degrade or disassociate due to the presence of the SCCO2.

Embodiment dispersions may include a percent volume of water as compared to the total volume of water and SCCO2. Embodiment dispersions may include in a range from about 60 to 70 vol. % (volume percent) of water. A greater water content contributes to an increased density of embodiment dispersions, as water has a greater density than SCCO2 under formation conditions. Additionally, embodiment water may include salts, clays and other components found in the previously described different water types, which may also contribute to embodiment dispersions having a greater density than SCCO2.

Embodiment dispersions may include any suitable amount of MCOF particles. In some embodiments, dispersions may include up to 5.0 wt. % (weight percent) of MCOF particles in terms of the total weight of the dispersion. Embodiment dispersions may have a lower limit of about 1.0, 1.5, 2.0, or 2.5 wt. % MCOF, and an upper limit of about 5.0, 4.5, 4.0, 3.5, or 3.0 wt. % MCOF, where any lower limit may be used in combination with any mathematically compatible upper limit.

Embodiment dispersions may have a bulk density suitable for mitigating gravity override. Such dispersions may have a bulk density in a range of from about 0.9 to 1.1 g/mL at formation conditions. Embodiment dispersions may include in a range from about 50 to 70 vol. % of capsules.

Method of Forming a Dispersion

Figure 5:
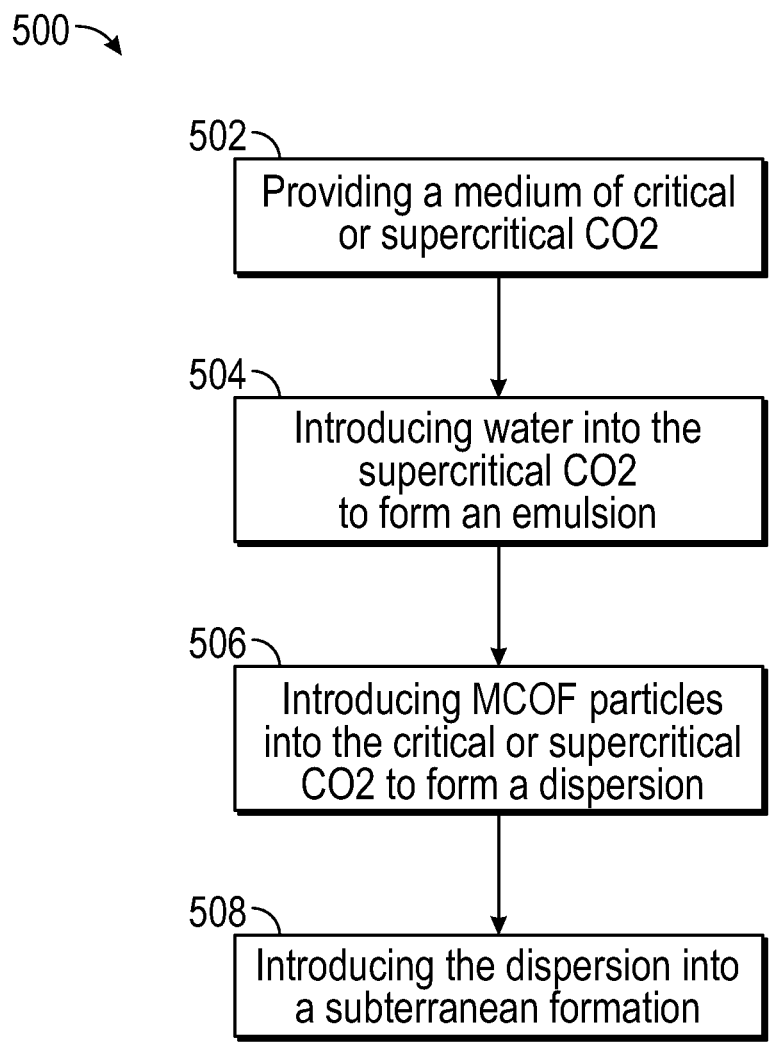
FIG. 5 is a block flow diagram of an embodiment method of making a dispersion.

In another aspect, embodiments disclosed here relate to a method of making the previously-described dispersion. FIG. 5 is a block flow diagram of an embodiment method of making a dispersion 500.

The method 500 may include providing a medium of carbon dioxide in the critical or supercritical state ("SCCO2") 502. In some embodiments, providing the medium may include introducing critical or supercritical carbon dioxide into a subterranean formation. In such cases, the dispersion may be produced in situ, that is, within the formation to be treated with the dispersion. As such, the treatment of the formation and the creation of the dispersion occur virtually simultaneously. In other embodiments, the dispersion is fabricated outside of a subterranean formation, such as on the surface or in a production facility, and provided as a complete system ready for introduction.

The method 500 may include introducing water into the critical or supercritical carbon dioxide such that an emulsion of water-in-SCCO2 forms 504. The SCCO2 may be in a temperature in a range of about 50 to 100° C. and a pressure in a range of from about 1500 to 5000 psi when water is introduced. The water may be introduced to SCCO2 by any suitable means in which the previously described temperatures and pressures may be maintained. For example, the water may be introduced by a pump configured to introduce fluids at a temperature and pressure greater than the temperature and pressure of the SCCO2, such by using a high pressure syringe pump. The water/SCCO2 may then be mixed using vigorous stirring to form an emulsion. If MCOF particles are already present in the SCCO2 as a dispersion, then the MCOF particles encapsulate the aqueous solution and the dispersion forms.

Upon introducing an aqueous solution into a SCCO2 medium, an emulsion of water droplets in SCCO2 may be formed. However, such emulsions may not be stable for extended periods. Water and SCCO2 naturally separate due to differences in polarity of the two fluids.

The method 500 may include introducing MCOF particles into the critical or supercritical carbon dioxide 506. The MCOF particles may be suspended in an appropriate diluent for the addition, such as supercritical carbon dioxide. The SCCO2 in embodiment dispersions may be in a temperature in a range of from about 50 to 100° C. and a pressure in a range of from about 1500 to 5000 psi when hydrophobic COF particles are added. MCOF particles may be added to the SCCO2 under vigorous stirring to evenly disperse the MCOF particles. The dispersion may then be stirred for about 30 to 60 minutes. If water is present in the SCCO2 medium and an emulsion is already present, the embodiment dispersion may immediately form. The MCOF particles described previously may be provided to the emulsion to encapsulate aqueous solution present, thereby mitigating the polarity difference, stabilizing the aqueous solution in the SCCO2 medium, and forming the embodiment dispersion. If the aqueous solution is not present in the SCCO2, then a dispersion of MCOF particles in the critical or supercritical $CO_2$ is formed.

In some embodiments, the water and MCOF particles may be introduced to the SCCO2 medium simultaneously.

When introduced into an aqueous-solution-in-SCCO2 emulsion, the previously-described MCOF particles may collect at the interfaces between the aqueous solution and the SCCO2 if water is already present in the SCCO2 medium. If water is not present, the MCOF particles will likely be distributed fairly evenly throughout the SCCO2 medium until water is present. When the aqueous solution is introduced, however, the MCOF particles will tend to aggregate on the surface of the aqueous solution even though they are hydrophobic. As the MCOF particles collect at the aqueous/SCCO2 interface, a layer of MCOF particles aggregate around the aqueous solution, as shown in FIG. 1. This MCOF layer serves to encapsulate the aqueous solution.

Although not wanting to be bound by theory, it is believed that due to the hydrophobic nature of the MCOF particles, Van der Walls forces between the $CO_2$ molecules in the SCCO2 and surfaces of the MCOF particles may be strong. This may have the effect of $CO_2$ molecules adsorbing to surfaces of the MCOF particles at SCCO2 conditions. As such, $CO_2$ molecules may pack more tightly near the surface of a capsule as compared to molecules in the bulk SCCO2 medium. This may result in an increase in the bulk density of SCCO2/capsule dispersion, which will mitigate the gravity override issue when in use in a formation or reservoir.

Method of Use in a Hydrocarbon-Bearing Formation

In another aspect, embodiments disclosed here relate to a method of using the previously-described dispersion in a hydrocarbon-bearing formation. As shown in FIG. 4, the dispersion comprising the capsules are shown traversing the pore structure of a reservoir.

As shown in FIG. 5, an embodiment method may include introducing the previously-described dispersion that comprises the capsules in SCCO2 into a subterranean formation, such as a hydrocarbon-bearing formation 508. Embodiment methods may include introducing a previously-formed dispersion having the previously-described capsules into a subterranean formation. In other embodiments, components of the dispersion may be introduced separately, meaning that the SCCO2, aqueous solution, and MCOF particles, may each be introduced separately into the formation, and the dispersion may be formed in the subterranean formation in situ. In one or more embodiments, the MCOF particles may be suspended in the SCCO2 when introduced into the reservoir, followed by the introduction of water.

Figure 6:
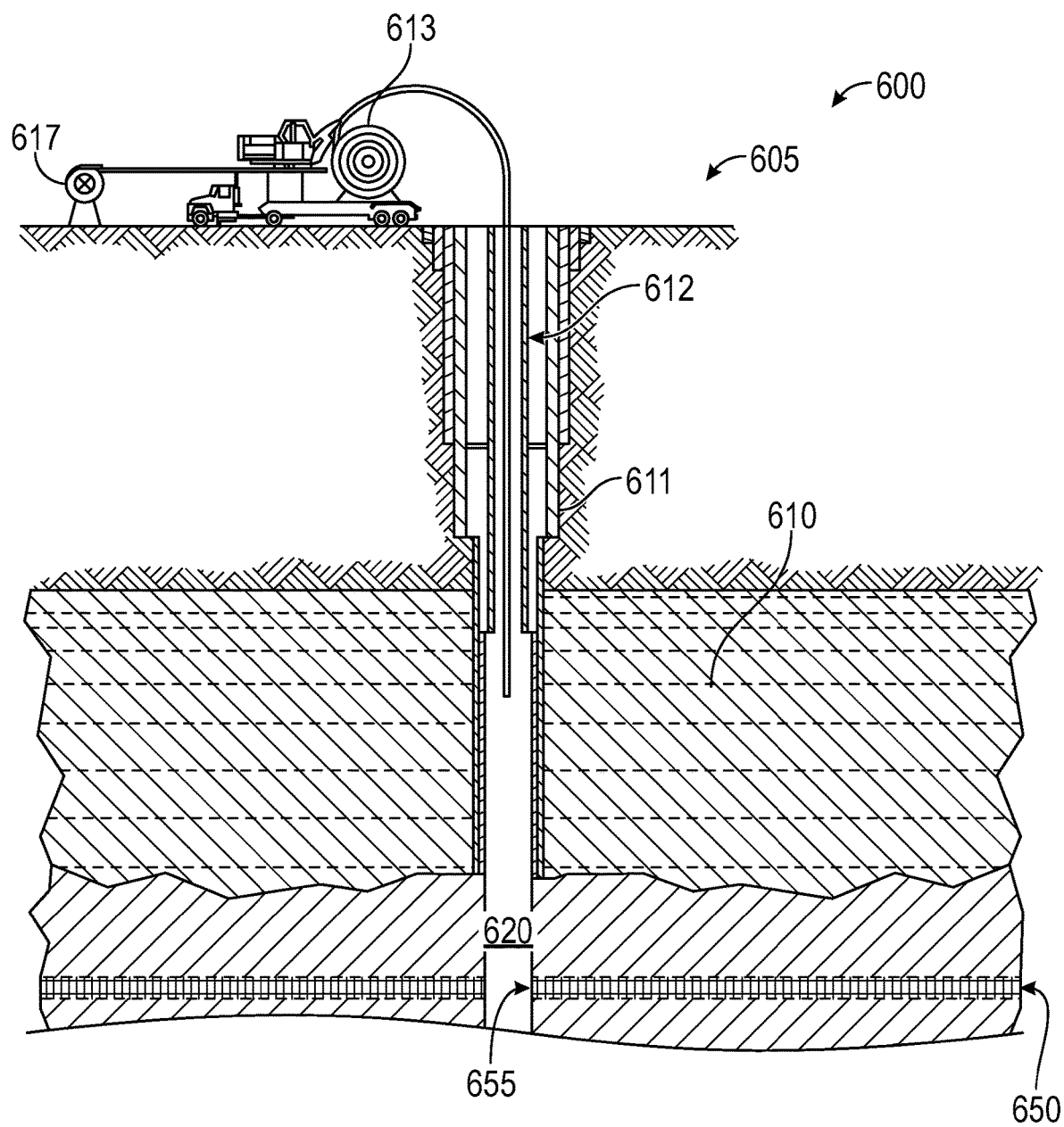
FIG. 6 is a simplified schematic of an embodiment hydrocarbon bearing formation.

FIG. 6 is a diagram that illustrates a well environment 600 in accordance with one or more embodiments. Well environment 600 includes a subsurface 610. Subsurface 610 is depicted having a wellbore wall 611 both extending downhole from a surface 605 into the subsurface 610 and defining a wellbore 620. The subsurface 610 also includes target formation 650 to be treated. Target formation 650 has target formation face 655 that fluidly couples target formation 650 with wellbore 620 through wellbore wall 611. In this case, casing 612 and coiled tubing 613 extend downhole through the wellbore 620 into the subsurface 610 and towards target formation 650.

With the configuration in FIG. 6, the previously-described dispersion that comprises the capsules in the SCCO2 medium may be introduced into the subsurface 610 and towards target formation 650 via a pump 617 through the coiled tubing 613. In another embodiment, as previously described, the dispersion may be formed in situ, meaning components of the dispersion (SCCO2, aqueous solution, MCOF particles) may be introduced into the subsurface 610 separately via the pump 617 through the coiled tubing 613, forming the dispersion inside the target formation 650. In such embodiments, multiple pumps may be used to separately inject components of the dispersion.

Hydrocarbon-bearing formations may include any oleaginous fluid, such as crude oil, dry gas, wet gas, gas condensates, light hydrocarbon liquids, tars, and asphalts, and other hydrocarbon materials. Hydrocarbon-bearing formations may also include aqueous fluid, such as water and brines. Hydrocarbon-bearing formations may include formations with pores sizes in a range of from about 100 nm to 100 μm. As such, capsules have sizes in an appropriate range to traverse the pores and migrate through the of hydrocarbon-bearing formation. Dispersions may be appropriate for use in different types of subterranean formations, such as carbonate, shale, sandstone, and tar sands.

Once a dispersion has been introduced into a hydrocarbon-bearing formation, the quantity of the dispersion recovered from the formation may be measured due to the presence of the magnetic particles in dispersions. In some embodiments, the quantity of the dispersion present downhole may also be measured.

Techniques for detecting the quantity of magnetic particles may include, but are not limited to, spintronic sensors, nuclear magnetic resonance (NMR) detection, superconducting quantum interference devices (SQUIDs), and atomic magnetometer (AM) sensors. Such detection may be performed on-site in a mobile laboratory, or samples may be collected and then analyzed off-site with suitable laboratory equipment.

In one or more embodiments, when an amount of a dispersion is collected at the surface, the quantity of MCOF particles may be detected. If no MCOFs are detected, this indicates that the dispersion has yet to break through at the surface. If MCOFs are detected, the quantity may be measured as a concentration, for example as a weight percentage of the total amount of dispersion. This quantity of MCOF particles can be compared to the initial quantity of MCOF particles introduced into the reservoir to determine an amount of recovered $CO_2$. For example, if the concentration of MCOF particles is lower than what was initially introduced into the formation, this indicates recovery of $CO_2$ from the reservoir. Such measurements may be taken at suitable intervals based upon the appropriate monitoring and surveillance needs of the particular formation. For example, the amount of MCOFs in a recovered dispersion may be measured monthly or quarterly.

When the word "approximately" or "about" are used, this term may mean that there can be a variance in value of up to ±10%, of up to 5%, of up to 2%, of up to 1%, of up to 0.5%, of up to 0.1%, or up to 0.01%.

Although only a few example embodiments have been described in detail, those skilled in the art will readily appreciate that many modifications are possible in the example embodiments without materially departing from the envisioned scope. Accordingly, all such modifications are intended to be included within the scope of this disclosure as defined in the following claims. In the claims, means-plus-function clauses are intended to cover the structures described as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112 (f) for any limitations of any of the claims, except for those in which the claim expressly uses the words 'means for' together with an associated function.

What is claimed is:

1. A composition of matter comprising:
a dispersion of capsules in critical or supercritical. carbon dioxide, the capsules comprising an aqueous solution encapsulated by magnetic covalent organic framework particles; wherein the magnetic covalent organic framework particles comprise a crystalline porous polymer, and wherein a BET surface area of the covalent organic framework particles is in a range of from about 700 to about 3700 $m^2/g$.

2. The composition of claim 1, where the capsules have an aqueous solution diameter in a range of from about 10 nm to 100 μm.

3. The composition of claim 1, where the magnetic covalent organic framework particles are hydrophobic.

4. The composition of claim 1, where the magnetic covalent organic framework particles comprise a magnetic particle selected from the group consisting of $\alpha Fe_2O_3$, $NiO$, $Y_3Fe_5O_{12}$, $SrFe_{12}O_{19}$, $(La, Sr)MnO_3$, $CrO_2$, $Tl_2Mn_2O_7$, $CuFe_2O_4$, and $Fe_3O_4$.

5. The composition of claim 1, where the dispersion comprises in a range of from about 60 to 70 vol. % of the aqueous solution.

6. The composition of claim 1, where the dispersion comprises up to 5.0 wt. % of the magnetic covalent organic framework particles.

7. The composition of claim 1, where the dispersion has a bulk density in a range of from about 0.9 to 1.1 g/mL.

8. A method of making a dispersion of aqueous solution capsules, the method comprising:
providing a medium of critical or supercritical carbon dioxide;

introducing an aqueous solution into the critical or supercritical carbon dioxide medium; and introducing a magnetic covalent organic framework particle into the critical or supercritical carbon dioxide medium to encapsulate the aqueous solution; wherein the magnetic covalent organic framework particles comprise a crystalline porous polymer, and wherein a BET surface area of the covalent organic framework particles is in a range of from about 700 to about 3700 $m^2/g$.

9. The method of claim 8, where the aqueous solution is introduced into the critical or supercritical carbon dioxide medium via a pump configured to introduce fluids at a temperature and pressure greater than a temperature of the critical or supercritical carbon dioxide medium and a pressure greater than a pressure of the critical or supercritical carbon dioxide medium.

10. The method of claim 8, where the aqueous solution and the magnetic covalent organic framework particle are introduced into the critical or supercritical carbon dioxide medium simultaneously.

11. The method of claim 8, where the aqueous solution is introduced into the critical or supercritical carbon dioxide medium prior to the magnetic covalent organic framework particle being into the critical or supercritical carbon dioxide medium.

12. The method of claim 8, where the magnetic covalent organic framework particle is introduced into the critical or supercritical carbon dioxide medium prior to the aqueous solution being introduced into the critical or supercritical carbon dioxide medium.

13. The method of claim 8, where the dispersion has a bulk density in a range of from about 0.9 to 1.1 g/mL.

14. A method comprising:
introducing into a hydrocarbon-bearing formation a dispersion of aqueous solution capsules in a medium of critical or supercritical carbon dioxide, where the capsules comprise an aqueous solution encapsulated by magnetic covalent organic framework particles; wherein the magnetic covalent organic framework particles comprise a crystalline porous polymer, and wherein a BET surface area of the covalent organic framework particles is in a range of from about 700 to about 3700 $m^2/g$.

15. The method of claim 14 further comprising:
collecting an amount of the dispersion at a surface of the hydrocarbon-bearing formation; and
detecting a quantity of the dispersion of aqueous solution capsules.

16. The method of claim 14, where the magnetic covalent organic framework particles are hydrophobic.

17. The method of claim 14, where the dispersion comprises in a range of from about 60 to 70 vol. % of the aqueous solution.

18. The method of claim 14, where the dispersion comprises up to 5.0 wt. % of the magnetic covalent organic framework particles.

* * * * *